United States Patent [19]

Kimura

[11] Patent Number: 4,774,400
[45] Date of Patent: Sep. 27, 1988

[54] METHOD AND APPARATUS FOR CORRECTING ANGULAR DEVIATION OF OPTICAL RECORDING MEDIUM

[75] Inventor: Fumio Kimura, Tokyo, Japan

[73] Assignee: Computer Services Corporation, Tokyo, Japan

[21] Appl. No.: 936,724

[22] Filed: Nov. 25, 1986

[30] Foreign Application Priority Data

Nov. 26, 1985 [JP] Japan ................. 60-265913

[51] Int. Cl.$^4$ ................. G06K 7/10; G06K 19/00
[52] U.S. Cl. ................. 235/454; 235/470
[58] Field of Search ........... 235/435, 454, 461, 470, 235/487, 491–494; 369/43–47; 250/201

[56] References Cited

U.S. PATENT DOCUMENTS

| | | |
|---|---|---|
| 4,145,758 | 3/1979 | Drexler et al. . |
| 4,269,917 | 5/1981 | Drexler et al. . |
| 4,278,756 | 7/1981 | Bouldin et al. . |
| 4,278,758 | 7/1981 | Drexler et al. . |
| 4,360,728 | 11/1982 | Drexler . |
| 4,500,777 | 2/1985 | Drexler . |
| 4,536,648 | 8/1985 | Kruse ................. 235/454 |
| 4,542,288 | 9/1985 | Drexler . |
| 4,544,835 | 11/1985 | Drexler . |
| 4,588,882 | 5/1986 | Buxton . |
| 4,598,196 | 7/1986 | Pierce et al. . |
| 4,634,850 | 1/1986 | Pierce et al. . |

*Primary Examiner*—Robert L. Richardson
*Attorney, Agent, or Firm*—Cushman, Darby & Cushman

[57] ABSTRACT

A method and apparatus for correcting an angular deviation which is applicable to an optical recording medium comprising a data recording region or regions defined by a reference line or lines having and data tracks perpendicular to the reference line or lines provided in the or each of the data recording regions for correcting an angular deviation on a data recording layer of said optical recording medium when the data is read by said photodetective sensor.

The angular deviation is corrected by reading, by a photodetective sensor, a position of a reference line of the optical recording medium within a sight of the photodetective sensor at least at two points in the length of the reference line to detect a deviation of the reference line within the sight of said photodetective sensor from a difference between the positions of the reference line read at said points; detecting an angular deviation from said deviation and a distance between said points where the position of the reference line are detected; and correcting said angular deviation on the basis of the detected angular deviation value.

19 Claims, 4 Drawing Sheets

METHOD AND APPARATUS FOR CORRECTING ANGULAR DEVIATION OF OPTICAL RECORDING MEDIUM

FIELD OF THE INVENTION

This invention relates to a method and apparatus for correcting an angular deviation, which is applicable to an optical recording medium comprising a data recording region or regions defined by a reference line (band having a width) or between reference lines (bands) and data tracks perpendicular to the reference line or lines which are provided in the recording region or each of the data recording regions for correcting an angular deviation on a data recording layer of said optical recording medium when the data is read from the optical recording medium.

RELATED ARTS

Figure 2:
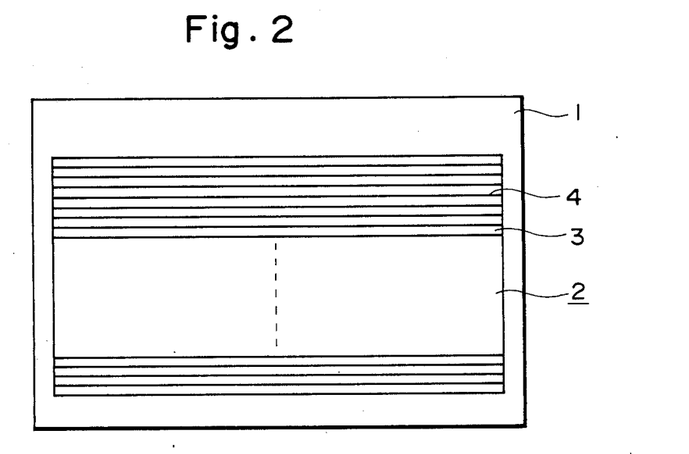
FIG. 2 is a plan views of one form of an optical recording medium to which the present invention is applied.
Figure 3:
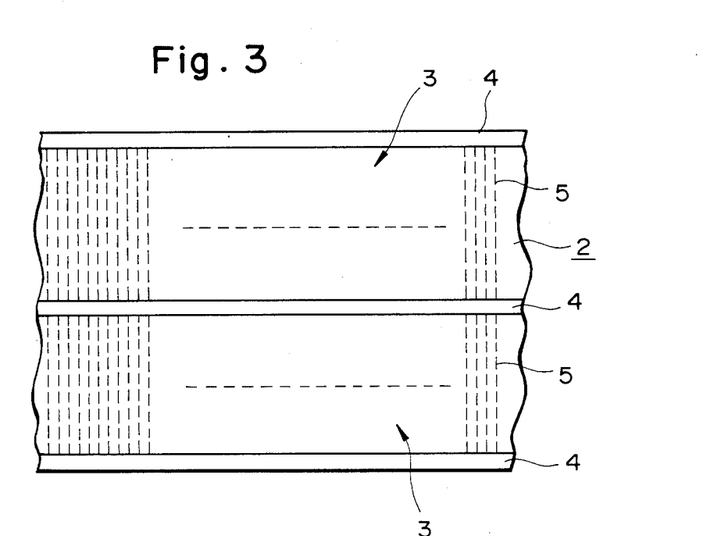
FIG. 3 is a partial enlarged view of the optical recording medium of FIG. 2.

Recently, optical recording media in the form of card or sheet have become of major interest, as mass storage media, in place of recording media such as magnetic recording cards or IC cards. The most typical examples of the optical recording media of this type are as illustrated in FIGS. 2 and 3.

The optical recording media as illustrated comprises a substrate 1 formed in a shape of a card and a layer 2 of a recording medium made of a material capable of forming optically changing patterns thereon, such as concavo-convex patterns or light-dark patterns, which is deposited on the substrate 1. The recording medium layer 2 comprises one or more reference line or lines 4 formed in a band or bands and one or more data recording region or regions 3 defined by the reference line 4 or between the reference lines 4. The data recording region 3 has a plurality of tracks 5 (shown by broken lines in the figures) in a direction perpendicular to the length of the reference line or lines 4 for bearing data in the form of trains of the optically changing patterns as mentioned above.

To read data from optical recording media of a disk type, such as a compact disk or optical disk, beams, for example, laser beams are shone along concentric or spiral tracks formed on the disk, sequentially following optically changing patterns of the data trains and the reflected beams or transmitted beams are received by photodetective elements. However, this data reading method can not effectively be applied to the optical recording media of card or sheet shape. Therefore, it is now proposed to use a sensor having a sight capable of viewing one or more tracks of data trains at once to read a considerable amount of data within a short period.

The sensor used for this purpose may preferably be a photodetecting sensor which is capable of detecting optical patterns having optically changing states along a given segment of a line. A CCD sensor is included among the preferred examples of the photodetecting sensors usable in the present invention.

In this connection, it is to be noted that when the data is read by the photodetective sensor (hereinafter represented by a CCD sensor), the CCD sensor should be in a plane parallel with a plane where the optical recording medium exists and it should be disposed so that the detection range of the sensor may be opposed accurately to the tracks in parallel therewith. However, it is, in fact, difficult to oppose the detection range or sight of the sensor to the tracks of the optical recording medium so as to accurately dispose it in parallel therewith. They are often angularly deviated or skewed from the mutual parallel position. If the deviation is large, there would possibly be caused misreading.

To obviate this problem, it is necessary to detect an angular deviation of the optical recording medium and to correct it. Heretofore, however, it has been difficult to detect the angular deviation of the optical recording medium accurately and there has not been a method which can correct the angular deviation with high precision.

The present invention has been made to obviate these problems and it is an object of the present invention to provide a method which is capable of detecting an angular deviation of an optical recording medium precisely and capable of correcting the angular deviation of the optical recording medium with high accuracy.

It is another object of the present invention to provide an apparatus for carrying out the angular deviation correcting method as mentioned above.

DISCLOSURE OF THE INVENTION

The present invention is applicable to the correction of an angular deviation of an optical recording medium in the reading of data from the optical recording medium comprising a data recording region or regions defined by a reference line or between reference lines and data tracks perpendicular to the reference line or lines provided in the data recording region or regions.

According to this method, positions of the reference line within a view range or sight of a photodetective sensor, which has a sight capable of viewing at least part of the length of the data track, are read at least at two points along the length of the reference line, to detect a deviation of the reference line within said sight of the sensor on the basis of the positions read in the respective points. An angular deviation is detected based on a distance between the points for reading the positions of the reference line and the deviation as detected above. The angular deviation is then corrected on the basis of the detected angular deviation value.

The present invention further features an apparatus for correcting an angular deviation of an optical recording medium, which comprises: a photodetective sensor functioning as a read sensor of a reading apparatus; a reference line detecting circuit for detecting a reference line based on the read signal output from the photodetective sensor; a reference line position detecting circuit for detecting the position of the reference line within a sight of the photodetective sensor which has been detected by the reference line detecting circuit; an angular deviation amount calculating circuit which stores the positions of the reference line detected at least at two points along the length of the reference line, obtains a deviation from said positions and calculates an angular deviation amount from said deviation and a distance between said two points; a rotation drive for rotating a table holding and supporting said optical recording medium thereon according to the calculated angular deviation amount supplied as a control signal; and an operation control device for controlling the operation of the members of said apparatus and supplying operation timing signals.

In the arrangement as described above, the photodetective sensor may be a sensor which is capable of detecting optical patterns having optically changing states formed along a given segment of a line. A CCD sensor is one of the preferred examples of the sensors of this type.

In the present invention, the reading of the reference line within the view range of the photodetective sensor at least at two points along the length of the reference line may be attained by various methods. For example, the CCD sensor may be moved in parallel by a feeding mechanism to move the sensor relatively with respect to the optical recording medium. Alternatively, the photodetective sensor may have a plurality of arrays of photodetective elements so that the spaced positions of the reference line within the respective view ranges of the arrays of the photodetective elements is read at different arrays of the photodetective elements. In this case, a CCD sensor is again employed preferably.

To detect a deviation within the view range of the photodetective sensor, various methods may be employed corresponding to the methods of reading the position of the reference line. For example, the deviation may be obtained on the basis of a difference between the positions of the reference line within the view ranges which have been detected at least at two points along the length of the reference line. Or, the deviation may be obtained from a difference between the positions of the reference line read at least at two arrays of the photodetective elements of the sensor within the respective view ranges.

The position of the reference line within the view range of the photodetective sensor may be detected, for example, by detecting a no-signal region (including a region having specific signal patterns) from data read by the photodetective sensor and by detecting the position of the no-signal region within the view range.

A distance between the two points used for obtaining the angular deviation can also be obtained by various methods. For example, a feeding signal supplied to a feeding mechanism for relatively moving the photodetective sensor may be utilized to count the distance between the two points. Alternatively, the two points may be preliminarily fixed to know the distance therebetween. In this case, the positions of the reference line within the view range of the photodetective sensor is detected at said fixed points. Or, when the photodetective sensor having a plurality of arrays of photodetective elements is used, the distance is given by the spacing between the arrays used for the deviation detection.

The angular deviation can be easily obtained from the distance between the two detecting points and the detected deviation of the reference line within the photodetective sensor.

The correction of the angular deviation is attained, in response, for example, to a pulsive signal as a control signal, by a rotation drive such as a step motor. The optical recording medium is rotated by the rotation drive by a required angle according to the control signal.

OPERATION

Figure 4:
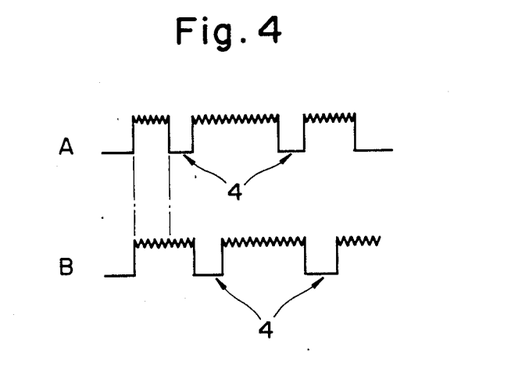
FIG. 4 consisting of A and B, is a waveform diagram showing data read by a CCD sensor at two points for detecting deviation detection.

The present invention is made based on a fact that a difference is caused between positions of the reference line when read, within the respective view ranges of the photodetective sensor, at least at two points along the length of the reference line, in case that the data tracks and the photodetective sensor such as a CCD sensor are not opposite to each other so as to be in parallel with each other. FIG. 4 exemplarily illustrates this, in which there is caused a difference between the positions of the reference line due to an angular deviation or skew.

More particularly, if the difference between the positions of the reference line within the view ranges of the photodetective sensor such as a CCD sensor at least at two points is assumed as d and a distance between the two points is assumed as w, an angular deviation $\phi$ is expressed by:

$$\phi = \tan^{-1}(d/w)$$

Thus, according to the present invention, the data read by the photodetective sensor such as a CCD sensor is utilized to detect a deviation of the reference line of the optical recording medium and an angular deviation or skew is calculated from this deviation and a distance between the deviation detecting points. Therefore, the angular deviation of the optical recording medium can be precisely detected and the correction of the angular deviation can be attained very accurately.

DESCRIPTION OF PREFERRED EMBODIMENTS

Referring to the drawings, preferred embodiment of the present invention will be described.

First Embodiment

Figure 1:
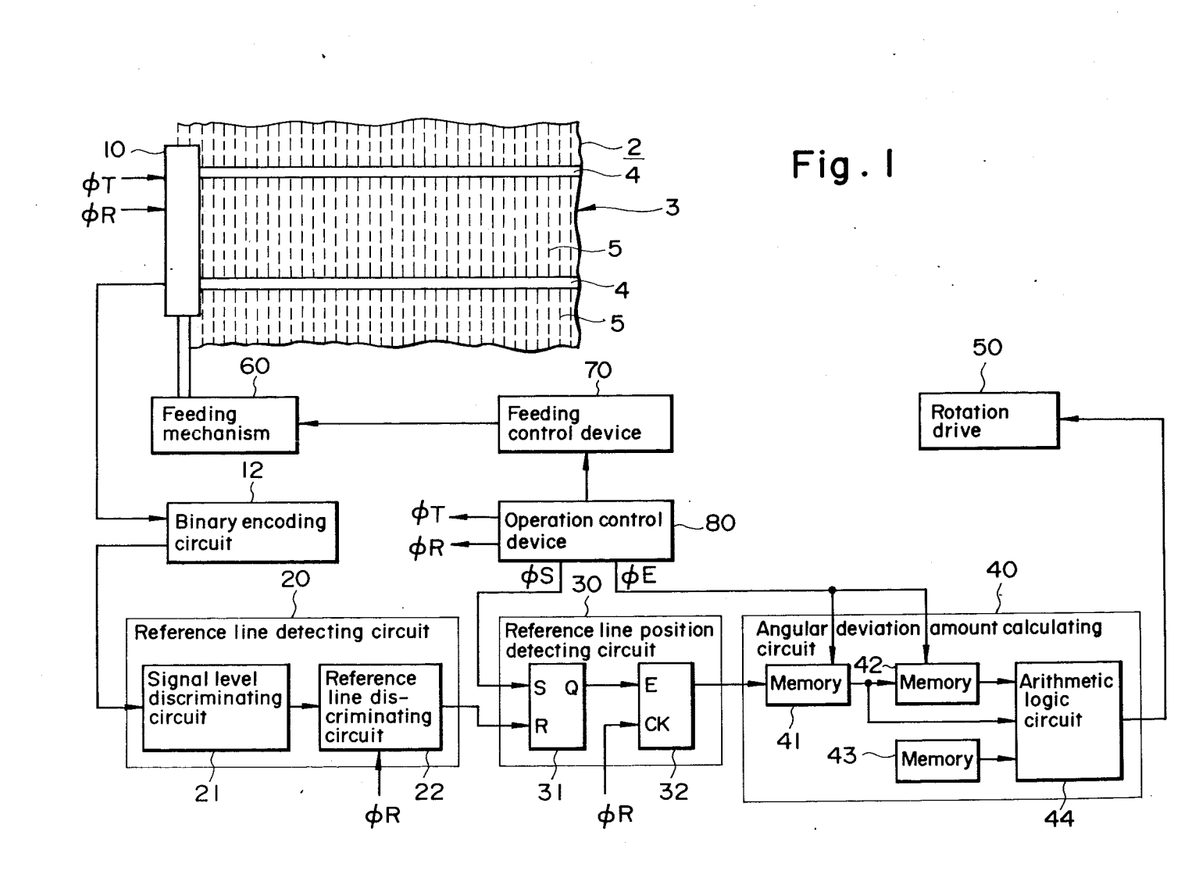
FIG. 1 is a block diagram of one form of an apparatus for carrying out an angular deviation correction method of the present invention.

FIG. 1 illustrates a system for carrying out an angular deviation or skew correcting method according to the present invention.

This embodiment is applicable to an optically recording medium as shown in FIGS. 2 and 3. More particularly, the optically recording medium, to which the present embodiment is applied, comprises, as fragmentarily illustrated in an enlarged scale in FIG. 1, a recording medium 2 made of a material which can form optically changing patterns, a plurality of reference lines (bands) 4 provided on the recording medium 2 and data recording regions 3 provided between each adjacent two reference lines 4. In each of the data recording regions 3, tracks 5, which is shown by broken lines in the figures, bearing data written in optically changing pattern trains in a direction perpendicular to the reference lines. The optically changing pattern trains are in the form of different reflectivity patterns in the present embodiment.

To make the reference lines 4 distinctive or distinguishable from the data trains in the data recording regions 3, the reference lines 4 may have patterns that the data do never assume. In the present embodiment, the reference lines 4 are formed as no-signal regions of a given width having a high reflectivity. Of course, the reference lines 4 may be regions of a low reflectivity.

A system used for correcting an angular deviation or skew of the optical recording medium when reading data from the optical recording medium according to the present invention comprises: a CCD sensor 10 functioning as a reading sensor of a reading apparatus; a reference line detecting circuit 20 for detecting a reference line from signals output from the CCD sensor 10; a reference line position detecting circuit 30 for detecting a position within the view range of the CCD sensor 10 of the position of the reference line detected by the reference line detecting circuit 20; an angular deviation calculating circuit 40 for storing the positions of the reference line detected at least at two points in a longitudinal direction of the reference line, obtaining a deviation from a difference between the the positions, and calculating an amount of the angular deviation from the deviation obtained and the distance between the said two positions on the reference line; a rotation drive 50 for rotating a table (not shown), on which the optical recording medium is placed and supported, according to a control signal obtained from the calculated angular deviation amount; a feeding mechanism 60 for relatively feeding the CCD sensor 10 in a lengthwise direction of the reference line with respect to the optical recording medium; a feeding control device 70 for controlling the feeding operation of the feeding mechanism 60; and an operation control device 80 for controlling the operation of the various sections of the system and transmitting operation timing signals to the sections.

The CCD sensor 10 comprises a plurality of photodetector elements in array and corresponding charge storage portions. This CCD sensor 10 has a view range wider than the width of the data recording region 3. The reading by the CCD sensor is controlled by a vertical synchronizing signal $\phi T$ for setting the reading initiation and a horizontal synchronizing signal $\phi R$ functioning as a shift pulse for sequentially shifting and transmitting the data read out. The data output is converted into digital data by a binary encoding circuit 12.

The reference line detecting circuit 20 comprises a signal level discriminating circuit 21 and a reference line discriminating circuit 22. The signal level discriminating circuit 21 includes, for example, an operational amplifier and detects a signal corresponding to a signal level of the reference line from the read out data which has been binary encoded as described above. The reference line disciminating circuit 22 includes, for example, a preset counter and it counts a predetermined clock signal (the signal $\phi R$ in the present embodiment) by using, as an enabling signal, the signal having the signal level corresponding to the reference line output from the signal level discriminating circuit 21. In contrast, a signal of a level not corresponding to the reference line resets the count. Thus, when the count reaches a predetermined value, the preset counter outputs a carry signal so that the reference line discriminating circuit 22 outputs the carry signal as a reference line detection signal.

The reference line position detecting circuit 30 comprises a flip-flop circuit 31 and a counter 32. The flip-flop circuit 31 is set by a set signal $\phi S$ from the operation control device 80 as will be described in detail later and reset by the reference line detection signal from the reference line discriminating circuit 22 as described above. The counter 32 counts the horizontal synchronizing signal $\phi R$ by using, as an enabling signal, a high-level output from the flip-flop circuit 31.

The angular deviation calculating circuit 40 comprises memories 41 and 42 for storing the positions of the reference line detected at least at two points in the longitudinal direction of the reference line, a memory for storing a distance between the two points, and an arithmetic logic circuit 44 which obtains a deviation from a difference between the positions of the reference line stored in the memories 41 and 42 and calculates the angular deviation amount from the deviation obtained and the distance between the two points.

The operation control device 80 comprises, for example, a clock generating circuit, a divider circuit, a timer, a delay circuit which are not shown in the figure. The operation control device 80 outputs the horizontal synchronizing circuit $\phi R$, the vertical synchronizing signal $\phi T$, the set signal $\phi S$ and the enabling signal $\phi$.

The method for correcting the angular deviation or skew by using the system of the present embodiment will now be described.

First, the operation control device 80 outputs a signal to the feeding control device 70 for initiallizing the CCD sensor 10. In response to this, the feeding control device 70 moves the CCD sensor 10 to an initial position by the feeding mechanism 60. The CCD sensor 10 is moved, by another feeding mechanism (not shown), in a direction perpendicular to that of the feeding mechanism 60, namely, in a direction of the width of the data recording region 3 to a position where the data recording region 3 and at least one of the reference lines 4 between which the data recording region 3 exists come in sight of the CCD sensor 10.

Then, the operation control device 80 outputs the vertical synchronizing signal $\phi T$ and the set signal $\phi S$ in synchronism with each other. In response to these signals, the CCD sensor 10 reads the optical patterns within the sight thereof by the photodetector elements and the flip-flop circuit 31 of the reference line position detecting circuit 30 is put into a set state.

Subsequently, the operation control device 80 supplies the horizontal synchronizing signal $\phi R$ to the CCD sensor 10, the reference line discriminating circuit 22 and the counter 32.

The CCD sensor 10, then, outputs serially the data read by the photodetector elements by using the horizontal synchronizing signal $\phi R$ as a shift pulse. The so output signal is converted into digital data by the binary encoding circuit 12 and input to the signal level discriminating circuit 21 of the reference line detecting circuit 20.

In this connection, it is to be noted that since the reference line 4 is in the form of a high reflectivity region in the present embodiment, the signal level discriminating circuit 21 extracts a signal which exceeds a predetermined level of the signal input thereto and supply the same to the reference line discriminating circuit 22.

The reference line discriminating circuit 22 counts the horizontal synchronizing signal $\phi R$ by using a signal from the signal level discriminating circuit 21 which has the signal level corresponding to the reference line as an enabling signal. A signal of a level which does not correspond to the reference line resets the count. Therefore, the counted value is reset to zero whenever the output from the signal level discriminating circuit 21 becomes low.

When the CCD sensor 10 successively generates highlevel outputs and the count value reaches a predetermined value, the reference line discriminating circuit 22 outputs a reference line detection signal.

This reference line detection signal is input to a reset terminal R of the flip-flop circuit 31 of the reference line position detecting circuit 30. This renders a Q output of the flip-flop circuit 31 low and the enabling signal for the counter 32 becomes low. As a result of this, the counting operation of the counter 32 which has been set by the set signal $\phi S$ from the operation control device 80 to count the horizontal synchronizing signal $\phi R$ is stopped.

The value counted by that time is stored in the memory 41 in response to an enabling signal $\phi E$ from the operation control device 80.

Then, the operation control device 80 transmits a signal to the feeding control device 70 for moving the CCD sensor 10 to a next reading position (towards a forward end of the reference line in the present embodiment) when the CCD sensor 10 has completed transmission of the data read by the CCD sensor 10 in response to $\phi R$. The feeding control device 70, then, moves the CCD sensor 10 towards the forward end of the reference line through the feeding mechanism.

Subsequently, the operation control device 80 outputs the vertical synchronizing signal $\phi T$ and the set signal $\phi S$ synchronized with the signal $\phi T$. In response to these signals, the CCD sensor 10 reads the optical patterns within the sight thereof by the photodetector elements and the flip-flop circuit 31 of the reference line position detecting circuit 30 is put into a set state.

Then, the horizontal synchronous signal $\phi R$ from the operation control device 80 is transmitted to the CCD sensor 10, the reference line discriminating circuit 22 and the counter 32.

Thereafter, the operations as described above are repeated to obtain the position of the reference line within the sight of the CCD sensor 10.

When the enabling signal $\phi E$ from the operation control device 80 is transmitted to the memories 41 and 42, the previous count value stored in the memory 41 is transferred to the memory 42 and stored there. A new count value is stored in the memory 41.

The operation control device 80, then, actuates the arithmetic logic circuit 44. The arithmetic logic circuit 44 calculates a deviation d from the count values stored in the memories 41 and 42 and reads in distance data w preliminarily stored in the memory 43 to obtain an angular deviation amount $\phi$ according to the formula as given before. The direction of the angular deviation of the optical recording medium may be detected on the basis of a difference between the count values stored in the memories 41 and 42. Thus, the direction of the angular deviation is expressed by a sign of the deviation d.

When the count values stored in the memories 41 and 42 are equal to each other or the difference between them is so triffle as to be negligible, it may be regarded as there is no angular deviation with the optical recording medium. Thus, the reading of the data can go on. On the other hand, if there is a significant difference which exceeds an allowance, then it is judged as there is an angular deviation with the optical recording medium and correction of the posture of the medium is necessitated.

FIG. 4 illustrates the data read from the CCD sensors 10 at the two points along the reference line as specified above. In this case, the positions of the reference line at a first read point A and a next read point B are deviated from each other. Thus, it can be regarded as there is an angular deviation.

When it is needed to carry out the correction of the angular deviation, the angular deviation amount $\phi$ is transmitted to the rotation drive 50. The rotation drive 50 rotates the table (not shown) by an angular degree corresponding to the deviation amount $\phi$ in a rotational direction determined by the sign of the deviation to correct the angular deviation or skew of the optical recording medium.

According to the present embodiment, the angular deviation or skew can be corrected in a manner as described above. In the present embodiment, the distance between the two points for detecting the deviation may be advantageously selected to be long so that even a triffle angular deviation can be detected in an enlarged scale.

Second Embodiment

A second embodiment of the present invention will now be described referring to the drawings.

This embodiment is also applicable to an optically recording medium similar to that as shown in FIGS. 2 and 3. However, This embodiment differs from the first embodiment in that a CCD sensor having a plurality of arrays of photodetector elements is employed in the present embodiment. This embodiment, therefore, has a characteristic feature that the deviation of the reference line is detected based on the data read between the different arrays of photodetector elements without relative movement of the CCD sensor with respect to the optical recording medium.

Figure 5:
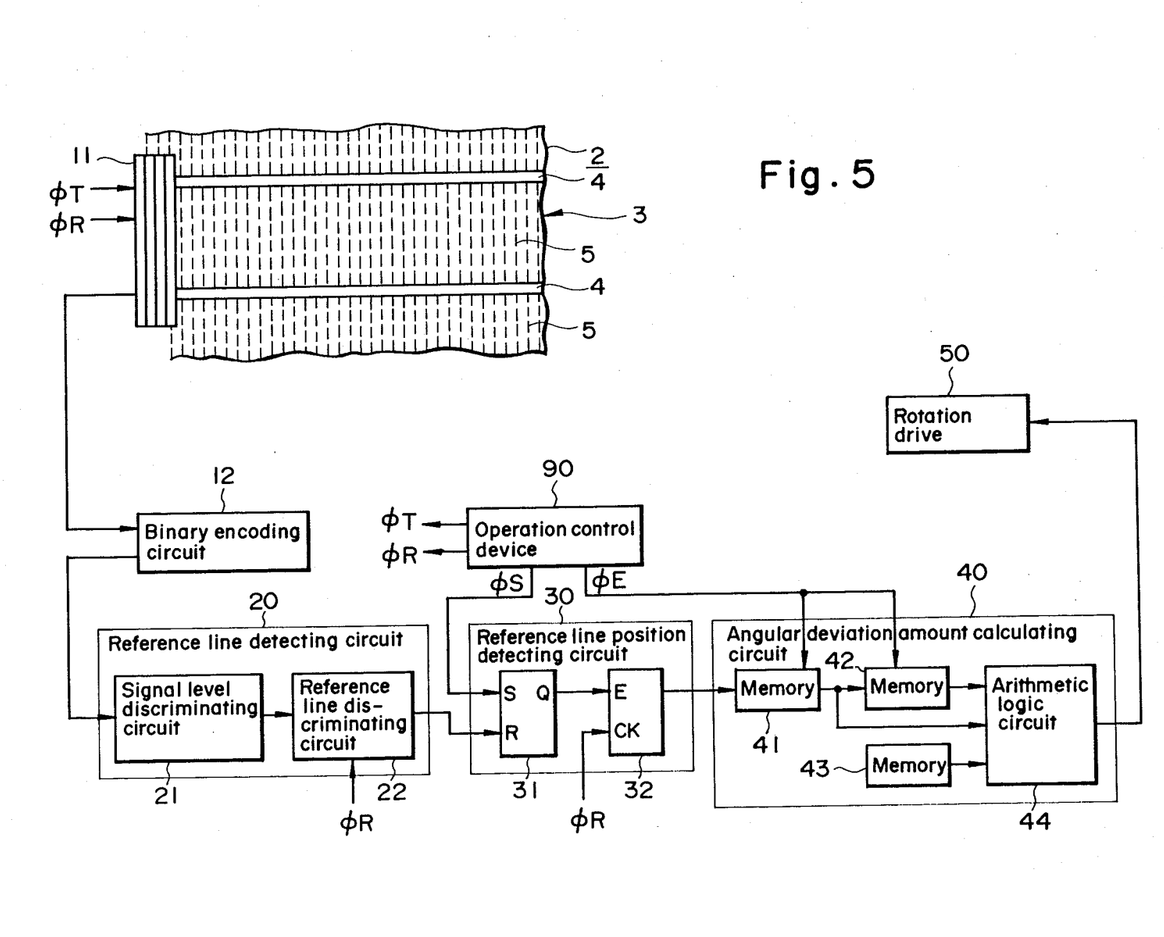
FIG. 5 is a block diagram of another form of an apparatus for carrying out the angular deviation correction method of the present invention.

A system for correcting an angular deviation or skew of the optical recording medium according to the present embodiment comprises: a CCD sensor 10 functioning as a reading sensor of a reading apparatus; a reference line detecting circuit 20 for detecting a reference line from signals output from the CCD sensor 10; a reference line position detecting circuit 30 for detecting a position within the range of the CCD sensor 11 of the position of the reference line detected by the reference line detecting circuit 20; an angular deviation calculating circuit 40 for storing the positions of the reference line detected at least at two points in a longitudinal direction of the reference line, obtaining a deviation from a difference between the the positions, and calculating an amount of the angular deviation from the deviation obtained and the distance between the said two positions on the reference line; a rotation drive 50 for rotating a table (not shown), on which the optical recording medium is placed and supported, according to a control signal obtained from the calculated angular deviation amount; and an operation control device 90 for controlling operations of the various sections of the system and supplying operating timing signals etc.

The present embodiment is substantially the same as the first embodiment except for the CCD sensor 11 and the operation control device 90. Therefore, the explanation will be referred only to the different features. In this connection, it is to be noted that, although the feeding mechanism for feeding the CCD sensor 11 along the length of the reference line is not used in association with the deviation correction, it is of course be provided for feeding the CCD sensor 11 for feeding the CCD sensor in associated with the reading of the data on the optical recording medium.

The CCD sensor 11 comprises a plurality of arrays of photodetector elements (four arrays P1 to P4 in the embodiment as illustrated) and corresponding charge storage portions. Each one array of photodetector elements of the CCD sensor 11 corresponds to the CCD sensor 10 of the first embodiment. This CCD sensor 11 has a view range or sight wider than the width of the data recording region 3. The reading by the CCD sensor is controlled by a vertical synchronizing signal $\phi T$ for setting the reading initiation and a horizontal synchronizing signal $\phi R$ functioning as a shift pulse for sequentially shifting and transmitting the data read out.

More specifically, each of the arrays P1 to P4 of the photodetector elements reads the data in such a way that the first array P1 initiates the reading in response to a first signal $\phi T$ and the second array P2 initiates the reading in response to a second signal $\phi T$ and so on. The data read in response to each $\phi T$ is shifted and output. The read data thus output is converted into digital data by the binary encoding circuit 12.

In the present embodiment, a deviation of the reference line is detected, for example, by the first array P1 of photodetector elements and the fourth array P4 of photodetector elements. Of course, another combination of arrays may be employed.

The operation control device 90 comprises, for example, a clock generating circuit, a divider circuit, a timer, a delay circuit which are not shown in the figure. The operation control device 90 outputs the horizontal synchronizing circuit $\phi R$, the vertical synchronizing signal $\phi T$, the set signal $\phi S$ and the enabling signal $\phi E$. The set signal $\phi S$ is transmitted to the set terminal S of the flip-flop circuit 31 of the reference line position detecting circuit 30 in synchronism with the vertical synchronizing signal $\phi T$ for instructing the initiation of the reading to the arrays P1 and P4 of photodetector elements which correspond to the detecting points. The enabling signal $\phi E$ is output after completion of the reading at the detecting points by the CCD sensor 11.

Figure 6:
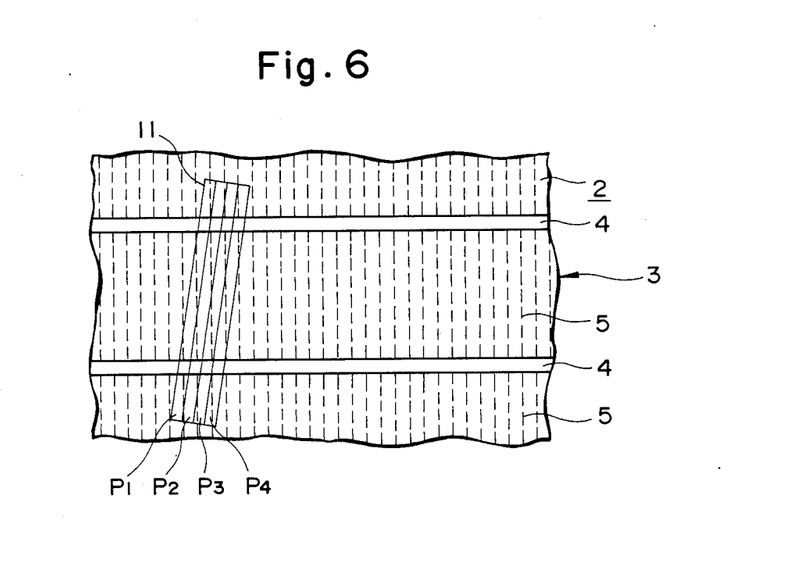
FIG. 6 is an explanatory view showing the operation of the second form of the apparatus.

The method for correcting the angular deviation or skew by using the system of the present embodiment will now be described referring to FIGS. 5 and 6.

First, the operation control device 90 outputs a signal to a feeding control device (not shown) for initiallizing the CCD sensor 11. In response to this, the feeding control device moves the CCD sensor 11 to an initial position by the feeding mechanism. The CCD sensor 11 is moved, by another feeding mechanism (not shown) to a position where the data recording region 3 and at least one of the reference lines 4 between which the data recording region 3 exists come in the sight of the CCD sensor 11.

Then, the operation control device 90 outputs the vertical synchronizing signal $\phi T$ and the set signal $\phi S$ in synchronism with each other. In response to these signals, the CCD sensor 11 reads the optical patterns within the sight of the first array P1 of photodetector elements by the same and the flip-flop circuit 31 of the reference line position detecting circuit 30 is put into a set state.

Subsequently, the operation control device 90 supplies the horizontal synchronizing signal $\phi R$ to the first array P1 of photodetector elements of the CCD sensor 11, the reference line discriminating circuit 22 and the counter 32.

The CCD sensor 11, then, outputs serially the data read by the first array P1 of the photodetector elements by using the horizontal synchronizing signal $\phi R$ as a shift pulse. The so output signal is converted into digital data by the binary encoding circuit 12 and input to the signal level discriminating circuit 21 of the reference line detecting circuit 20.

Thereafter, the reference line is detected by the reference line detecting circuit 20 as in the first embodiment and the read position is detected by the reference line position detecting circuit 30 through the counting of $\phi R$. The count value indicative of the read position is stored in the memory 41 in response to the enabling signal $\phi E$ from the operation control device 90.

When all the data read by the CCD sensor 11 in response to $\phi R$ has been transmitted, the operation control device 90 transmits a next vertical synchronizing signal $\phi T$ to the second array P2 of the photodetector elements.

In the second array P2 of the photodetector elements, the reference line is also detected by the reference line detecting circuit 20 from the data read. In this case, however, the set signal $\phi S$ is not output. Therefore, the signals $\phi R$ are not counted by the reference line position detecting circuit 30.

Similarly, the data is also read in the third array P3 of the photodetector elements which receives a further succeeding vertical synchronizing signal $\phi T$ from the operation control device 90. However, the signals $\phi R$ are not counted by the reference line position detecting circuit 30.

Then, the operation control device 90 transmits a further succeeding vertical synchronizing signal $\phi T$ to the fourth array P4 of the photodetector elements and the set signal $\phi S$ to the flip-flop circuit 31 when all the data read by the CCD sensor in response to $\phi R$ has been transmitted.

At this time, since the set signal $\phi S$ is output, the reference line is detected by the reference line detecting circuit 20 from the data read and the signals $\phi R$ are counted by the reference line position detecting circuit 30. Thereafter, when the enabling signal $\phi E$ from the operation control device 90 is transmitted to the memories 41 and 42, the previous count value stored in the memory 41 is transferred to the memory 42 and a new count value is stored in the memory 41.

Thereafter, an angular deviation amount is calculated by the arithmetic logic circuit 44 as in the first embodiment. The angular deviation is corrected by the rotation drive 50 on the basis of the calculated angular deviation amount. In this connection, it is to be noted that a distance between the first array P1 of the photodetector elements and the fourth array P4 of the photodetector elements is preliminarily stored as an apparatus constant in the memory 43.

According to the present embodiment, a possible deviation of the reference line can be detected without relative movement of the CCD sensor with respect to the optical recording medium as different from the first embodiment. With this arrangement, the detecting time can be shortened and a possible error due to the relative movement between the CCD sensor and the optical recording medium can be prevented.

Modification of Embodiments

Although the distance between the two points for detecting the reference line is fixed in the first embodiment, the present invention is not limited thereto. For example, the two points may be arbitrarily selected. In this case, the distance between the points is known by counting the feeding signals for the relative movement of the CCD sensor.

The CCD sensor has four arrays of the photodetector elements in the second embodiment, but the present invention is not limited thereto and the number of the arrays may be suitably selected so far as it is two or more. In this case, the CCD sensor having a plurality of photodetector element arrays may also be used in a manner as disclosed in the first embodiment.

Although the foregoing two embodiments are described referring to their application to a card-shaped optical recording medium, they are also applicable to a sheet-shaped optical recording medium.

Furthermore, the deviation is detected by the two spaced points on the reference line, but three points may be used for the detection of the deviation.

Besides, although the CCD sensor is used in the foregoing two embodiments, any photodetective sensor may be employed which is capable of detecting the optical patterns in which optically changing states are formed along a segment of a line.

What is claimed is:

1. A method for correcting an angular deviation of an optical recording medium in reading data from the optical recording medium comprising a data recording region or regions defined by a reference line or between reference lines and data tracks perpendicular to the reference line or lines provided in said data recording region or regions, which method comprises:

reading positions of the reference line within a view range of a photodetective sensor having a sight capable of viewing at least part of the length of the data track, at least at two points along the length of said reference line, to detect a deviation of the reference line within said sight of the sensor from the positions read in the sight;

detecting an angular deviation based on a distance between said points for reading the positions of the referent line and the deviation as detected above; and correcting the angular deviation based on the detected angular deviation value.

2. A method as claimed in claim 1, wherein said photodetective sensor is relatively moved in the longitudinal direction of the reference line with respect to the medium to read the positions of said reference line or within a view range of the photodetective sensor at least at two points along the length of said reference line, to detect a deviation of the reference line within said sight of the sensor from the positions read within the sight.

3. A method as claimed in claim 1, wherein said photodetective sensor comprises a plurality of arrays of photodetective elements to read the positions of said reference line within a view range of said photodetective sensor at least at two arrays of the photodetective elements to detect a deviation of the reference line within said sight of the sensor from the positions read in the respective sights of the arrays; and an angular deviation is detected based on a distance between said arrays of the photodetective elements used for reading the positions of the referent lines and the deviation as detected.

4. A method as claimed in claim 2, wherein said photodetective sensor is moved in parallel by a feeding mechanism so that said sensor is moved relatively with respect to the optical recording medium 5. A method as claimed in claim 2, wherein said reference line is detected by detecting a no-signal region (including a region having specific signal patterns) of a predetermined width from data read by the photodetective sensor and the position of said no-signal region within the sight to detect the position of the reference line within the sight.

6. A method as claimed in claim 3, wherein said reference line is detected by detecting a no-signal region (including a region having specific signal patterns) of a predetermined width from data read by the photodetective sensor and the position of said no-signal region within the sight to detect the position of the reference line within the sight.

7. A method as claimed in claim 2, wherein the angular deviation amount in the form of a pulsive control signal is transmitted to a rotation drive comprising a step motor to rotate the optical recording medium by a required angle for correcting the angular deviation.

8. A method as claimed in claim 3, wherein the angular deviation amount in the form of a pulsive control signal is transmitted to a rotation drive comprising a step motor to rotate the optical recording medium by a required angle for correcting the angular deviation.

9. A method as claimed in claim 5, wherein the angular deviation amount in the form of a pulsive control signal is transmitted to a rotation drive comprising a step motor to rotate the optical recording medium by a required angle for correcting the angular deviation.

10. A method as claimed in claim 6, wherein the angular deviation amount in the form of a pulsive control signal is transmitted to a rotation drive comprising a step motor to rotate the optical recording medium by a required angle for correcting the angular deviation.

11. An apparatus for correcting an angular deviation of an optical recording medium, which comprises:

a photodetective sensor functioning as a read sensor of a reading apparatus;

a reference line detecting circuit for detecting a reference line from the read signal output from said photodetective sensor;

a reference line position detecting circuit for detecting the position of the reference line within a sight of said photodetective sensor which has been detected by the reference line detecting circuit;

an angular deviation amount calculating circuit which stores the positions of the reference line detected at least at two points in the length of the reference line, obtains a deviation from said positions and calculates an angular deviation amount from said deviation and a distance between said two points;

a rotation drive for rotating a table holding and supporting said optical recording medium thereon according to the calculated angular deviation amount supplied as a control signal; and an operation control device for controlling the operation of the members of said apparatus and supplying operation timing signals.

12. An apparatus as claimed in claim 11, which further comprises a feeding mechanism for relatively moving said photodetective sensor in a longitudinal direction of the reference line and a feeding control device for controlling the feeding operation of said feeding mechanism so that the position of the reference line is detected at least at two points along the length of the reference line.

13. An apparatus as claimed in claim 11, wherein said photodetective sensor comprises a plurality of arrays of photodetective elements and the deviation of the reference line is detected on the basis of data read at different arrays of the photodetective elements.

14. A method for correcting an angular deviation of an optical recording medium, which comprises:

reading, by a photodetective sensor, a position of a reference line of the optical recording medium within a sight of the photodetective sensor at least at two points in the length of the reference line to detect a deviation of the reference line within the sight of said photodetective sensor from a difference between the positions of the reference line read at said points;

detecting an angular deviation from said deviation and a distance between said points where the position of the reference line are detected; and correcting said angular deviation on the basis of the detected angular deviation value.

15. A method as claimed in claim 14, which is applied to the optical recording medium of a type which comprises a data recording region or regions defined by a reference line or between reference lines and data tracks perpendicular to the reference line or lines provided in the or each of the data recording regions and used for correcting an angular deviation on a data recording layer of said optical recording medium when the data is read by said photodetective sensor.

16. A method as claimed in claim 2, wherein said photodetective sensor is a CCD sensor.

17. A method as claimed in claim 3, wherein said photodetective sensor is a CCD sensor.

18. A method as claimed in claim 12, wherein said photodetective sensor is a CCD sensor.

19. A method as claimed in claim 13, wherein said photodetective sensor is a CCD sensor.

* * * * *